Nov. 9, 1948.    W. D. ORSER    2,453,336
PERISCOPE LENS SYSTEM
Filed March 31, 1945    2 Sheets-Sheet 1
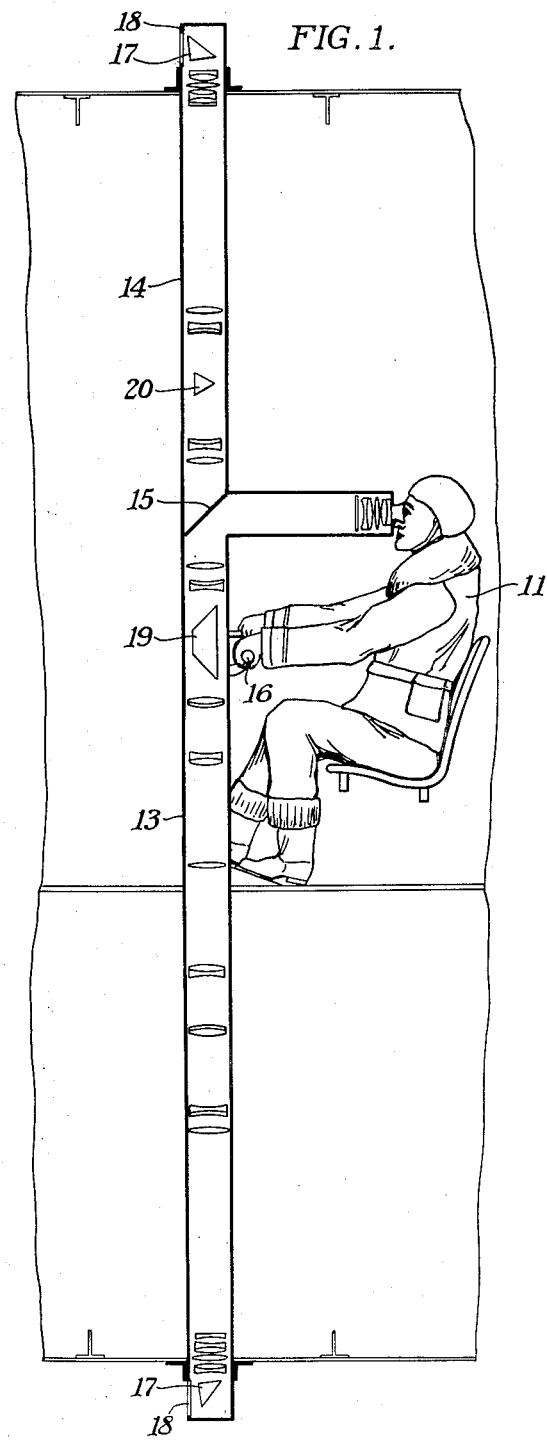
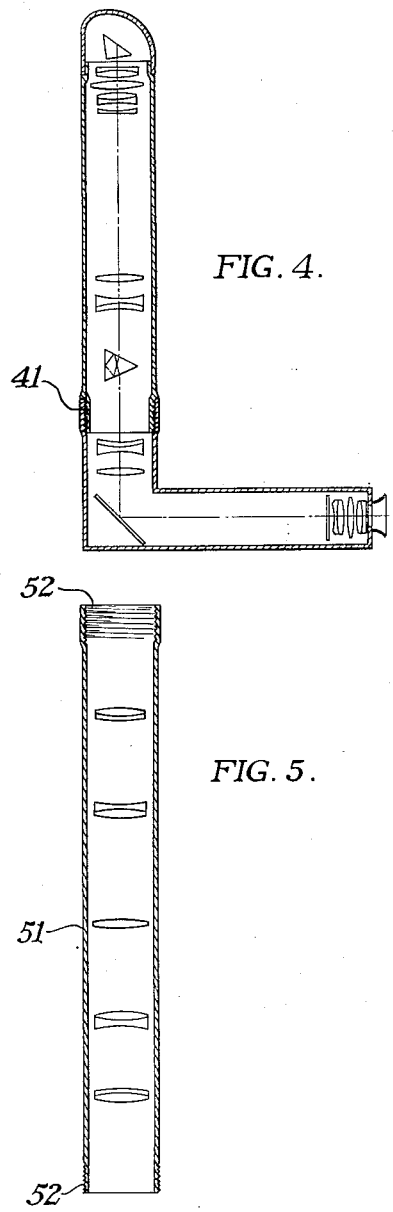
WILLIAM D. ORSER
INVENTOR
BY
ATT'Y & AG'T Nov. 9, 1948.  W. D. ORSER  2,453,336
PERISCOPE LENS SYSTEM
Filed March 31, 1945  2 Sheets-Sheet 2

FIG. 2.

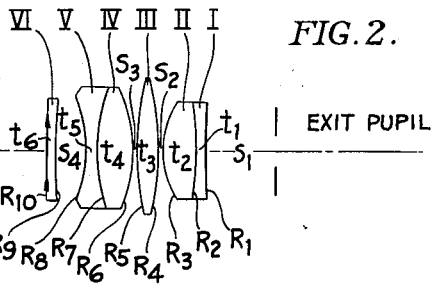

FIG. 3.

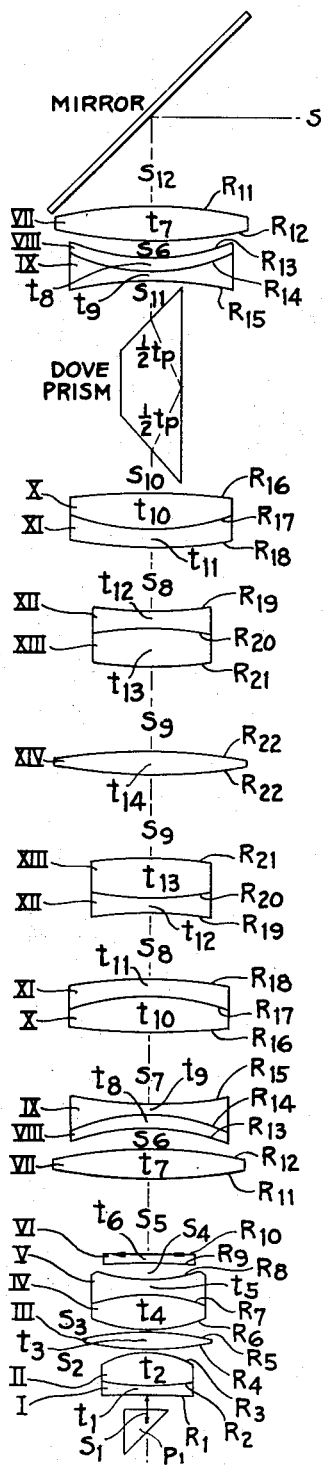

| UNIT POWER | | | ANGULAR FIELD ±35° | |
|---|---|---|---|---|
| LENS | N | V | RADII | THICKNESSES |
| I | 1.672 | 32.2 | $R_1 = -545.29$ | $S_1 = 31.0$ |
| II | 1.620 | 60.3 | $R_2 = +54.87$ | $t_1 = 3.90$ |
|  |  |  | $R_3 = -41.43$ | $t_2 = 21.42$ |
| III | 1.620 | 60.3 | $R_4 = +115.80$ | $S_2 = 0.24$ |
|  |  |  | $R_5 = -115.80$ | $t_3 = 10.02$ |
| IV | 1.620 | 60.3 | $R_6 = +43.16$ | $S_3 = 0.24$ |
| V | 1.672 | 32.2 | $R_7 = -99.12$ | $t_4 = 22.8$ |
|  |  |  | $R_8 = +45.12$ | $t_5 = 3.28$ |
| VI | 1.672 | 32.2 | $R_9 = -66.95$ | $S_4 = 10.05$ |
|  |  |  | $R_{10} = \infty$ | $t_6 = 3.5$ |
| VII | 1.617 | 55.0 | $R_{11} = +107.40$ | $S_5 = 466.99$ |
|  |  |  | $R_{12} = -172.45$ | $t_7 = 14.91$ |
| VIII | 1.697 | 56.1 | $R_{13} = -73.44$ | $S_6 = 30.0$ |
| IX | 1.617 | 38.5 | $R_{14} = -46.72$ | $t_8 = 6.0$ |
|  |  |  | $R_{15} = +385.24$ | $t_9 = 6.0$ |
| X | 1.697 | 56.1 | $R_{16} = +386.18$ | $S_7 = 168.4$ |
| XI | 1.755 | 47.2 | $R_{17} = -150.18$ | $t_{10} = 10.0$ |
|  |  |  | $R_{18} = -306.19$ | $t_{11} = 5.0$ |
| XII | 1.617 | 36.6 | $R_{19} = -100.74$ | $S_8 = 115.5$ |
| XIII | 1.620 | 60.3 | $R_{20} = +72.87$ | $t_{12} = 5.0$ |
|  |  |  | $R_{21} = -195.0$ | $t_{13} = 10.0$ |
| XIV | 1.517 | 64.5 | $R_{22} = +210.06$ | $S_9 = 233.76$ |
| PRISM | 1.610 | 57.2 |  | $t_{14} = 6.0$ |
|  |  |  |  | $t_p = 115.4$ |
|  |  |  |  | $S_{10} = 68.03$ |
|  |  |  |  | $S_{11} = 65.32$ |
|  |  |  |  | $S_{12} = 119.25$ |
|  |  |  |  | $S_{13} = 350.0$ |

WILLIAM D. ORSER
INVENTOR

BY
ATT'Y & AGT

Patented Nov. 9, 1948

2,453,336

UNITED STATES PATENT OFFICE 2,453,336

PERISCOPE LENS SYSTEM

William Donald Orser, Rochester, N. Y., assignor to Eastman Kodak Company, Rochester, N. Y., a corporation of New Jersey Application March 31, 1945, Serial No. 585,861

5 Claims. (Cl. 88—57)

This invention relates to periscope lens systems.

An object of the invention is to provide periscopes of different tube lengths and with interchangeable parts.

An object of one embodiment of the invention is to provide an improved periscope convertible from a longer tube length to a shorter tube length without impairing its optical efficiency.

An object of another embodiment of the invention is to provide a plural-ended periscope suitable for use in airplanes and the like.

An ancillary object of the invention is to provide a novel and improved arrangement of relay lenses.

Still a further object of the invention is to provide a periscope embodying the principles disclosed in copending applications Serial Nos. 511,060; 511,061; and 511,062 by Fred E. Altman, filed November 20, 1943, now Patents Nos. 2,405,729; 2,423,676; and 2,430,549 respectively.

Heretofore it has been usual in the design of periscope systems to add relay lenses in series in order to obtain the length of tube desired. Relay lenses conveniently work at about unit magnification and are corrected for transverse aberrations by being symmetrical about a central stop. Thus in a conventional system with two relay lenses, the image formed by the objective of the system is sharply reimaged by the first relay lens, this second image is reimaged by the second relay lens into the focal plane of the eyepiece. A positive field lens is provided between the two relay lenses substantially to prevent vignetting (darkening of the edges of the field of view).

A convertible periscope usually consists of a system having a plurality of relay lenses of which at least one is removable, the remaining two parts of the system being then brought together to form a periscope of shorter length.

According to the present invention, a periscope system having at least two relay lenses each consisting of two halves is converted into a shorter system by removing the adjacent halves of each of two relay lenses along with the field lens therebetween and then bringing the remaining halves closer to each other along with the other lenses associated therewith.

An erecting prism or antirotation prism of known construction (such as a Dove prism) is used in periscope systems between the halves of one relay lens. This does not interfere with the present invention, however, since the prism remains in the system.

Whereas in the prior art it is known to make each relay lens symmetrical per se to eliminate transverse aberrations in each successive image, the long system according to the present invention is distinguished by having two relay lenses symmetrical (except for the prism) with respect to a field lens therebetween, and not necessarily symmetrical within themselves. This offers an incidental advantage, besides the principal advantages to be described later, in that the image at the field lens does not need to be sharp and hence any specks appearing on this field lens will not be seen so sharply by the operator of the periscope.

A system which is symmetrical except for the prism or prisms will be described as "optically symmetrical" hereinafter and in the claims.

Several embodiments of the invention are contemplated. According to one embodiment, a periscope system is made up having joints in its outer tube at the central airspaces of at least two adjacent relay lenses, whereby the part of the tube between two joints is removable and the remaining parts of the system are conjoinable forming a single joint instead of two. If desired, a section of tube of different length and containing relay lens halves of different focal length may be provided to be substituted for the one removed.

According to another embodiment of the invention a plural-ended periscope is provided which has a short tube length in one direction and a long tube length in another direction. The two (or more if desired) tubes have a common eyepiece, and the operator looking into the eyepiece selects the tube he wishes to look through by rotating a selecting mirror. The axis of the eyepiece may conveniently be at right angles to the axes of the periscope tubes.

This embodiment is particularly suitable for use in an airplane. The operator is seated within the airplane and the eyepiece is at a convenient height in front of his eye. The eyepiece is horizontal or nearly so, a slope of a few degrees usually being found less fatiguing to the operator. The short tube goes up through the top of the body of the airplane and the long tube goes down through the bottom. The operator changes over from one tube to the other by a prism or plane mirror rotatable alternatively to two positions. The axis of rotation of the mirror is conveniently in a direction perpendicular to both the eyepiece axis and the common axis of the two tubes, but it is not necessarily so.

Plural-ended periscopes according to the invention have two marked advantages over the prior art. First, the objectives and erector lenses of the short tube are duplicated in the long tube, thus reducing the stock of replacement parts and the cost of maintenance. Second, and more important, the eyepoint is not shifted when changing over from looking through one tube to the other. This latter condition could be met by the prior art by certain special arrangements, but these special arrangements would often preclude the use of the most convenient relative tube lengths. By maintaining the eyepoint position, the coma correction of the eyepiece is also retained. Moreover, the change-over is much less annoying to the operator.

In the accompanying drawings:

Fig. 1 shows a double-ended periscope.

Figs. 2 and 3 show the long end in greater detail, and give the construction data.

Figs. 4 and 5 show a convertible periscope.

In Fig. 1 the operator 11 looks into the eyepiece 12 and through either the long end 13 (as shown) or the short end 14 according to the position of the mirror 15. Hand controls 16 control the rotation of the scanning prisms 17 and of the periscope head with its window 18 by mechanical means not shown and likewise control the aiming of guns not shown. The anti-rotation prisms 19 and 20 are geared to the periscope heads so as to maintain an erect image in the operator's field of view. It is convenient to provide an automatic control whereby the mirror 15 snaps over to the other position after the line of sight has swung past the horizontal by several degrees, but none of these mechanical features are part of the present invention which relates to the optical system.

It will be noted that two types of antirotation prisms are shown, a Dove prism and another type sometimes called a V-prism. The latter must be made of a high index glass and must be silvered on the base. The optical effect of the two prisms is broadly the same, differing only slightly in the aberrations introduced by the tilted plane surfaces. The mechanical length of tube is different, however, and thus they furnish the designer with an additional means of adapting to slightly different tube lengths.

Except for the prisms, the long system shown in Fig. 2 is symmetrical with respect to the center of the field lens XIV. In Figs. 2 and 3 and likewise in the table of constructional data repeated below, the lens elements are indicated by Roman numerals counting from both ends toward the middle. The spaces S and the thicknesses T are likewise numbered from both ends toward the middle except that some of the spaces in the eyepiece end which differ from the corresponding spaces in the objective end are given the designations $S_{10}$ to $S_{13}$. Specifically $$\left(S_{10}+S_{11}+\frac{t_p}{N_p}\right)$$

corresponds to $S_7$ and $(S_{12}+S_{13})$ corresponds to $S_5$. On the objective end, $S_1$, is the distance to the rotation point of the prism, and on the eyepiece end the corresponding length is the eyepoint distance, i. e. the distance from the last surface $R_1$, to the exit pupil.

The refractive index N is given for the D line of the spectrum, and V designates the customary dispersive index. The radii R are also numbered from both ends toward the middle of the system and are given with a positive sign if the surface is concave toward the middle and is negative if convex thereto.

The constructional data shown in Fig. 3 are as follows:

| Lens | N | V | Radii | Thickness |
| --- | --- | --- | --- | --- |
| I | 1.672 | 32.2 | $R_1=-545.29$ | $S_1=31.0$ |
| II | 1.620 | 60.3 | $R_2=+54.87$ | $t_1=2.90$ |
|  |  |  | $R_3=-41.43$ | $t_2=21.42$ |
|  |  |  |  | $S_2=0.24$ |
| III | 1.620 | 60.3 | $R_4=+115.80$ | $t_3=10.02$ |
|  |  |  | $R_5=-115.80$ | $S_3=0.24$ |
| IV | 1.620 | 60.3 | $R_6=+43.16$ | $t_4=22.8$ |
| V | 1.672 | 32.2 | $R_7=-99.12$ | $t_5=3.28$ |
|  |  |  | $R_8=+45.12$ | $S_4=10.05$ |
| VI | 1.672 | 32.2 | $R_9=-66.95$ | $t_6=3.5$ |
|  |  |  | $R_{10}=\infty$ | $S_5=467.0$ |
| VII | 1.617 | 55.0 | $R_{11}=+107.40$ | $t_7=14.91$ |
|  |  |  | $R_{12}=-172.45$ | $S_6=30.0$ |
| VIII | 1.697 | 56.1 | $R_{13}=-73.44$ | $t_8=6.0$ |
|  |  |  | $R_{14}=-46.72$ | $t_9=6.0$ |
| IX | 1.617 | 38.5 | $R_{15}=+385.24$ | $S_7=168.4$ |
|  |  |  | $R_{16}=+386.18$ | $t_{10}=10.0$ |
| X | 1.697 | 56.1 | $R_{17}=-150.18$ | $t_{11}=5.0$ |
| XI | 1.755 | 47.2 | $R_{18}=-306.19$ | $S_8=115.5$ |
|  |  |  | $R_{19}=-100.74$ | $t_{12}=5.0$ |
| XII | 1.617 | 36.6 | $R_{20}=+72.87$ | $t_{13}=10.0$ |
| XIII | 1.620 | 60.3 | $R_{21}=-195.0$ |  |
| XIV | 1.517 | 64.5 | $R_{22}=+210.06$ | $S_9=233.76$ |
| Prism | 1.610 | 57.2 |  | $t_{14}=6.0$ |
|  |  |  |  | $t_p=115$ |
|  |  |  |  | $S_{10}=68.03$ |
|  |  |  |  | $S_{11}=65.32$ |
|  |  |  |  | $S_{12}=119$ |
|  |  |  |  | $S_{13}=350.0$ |

Lenses I to V form two identical members of the optical system, in one case acting as the objective, and in the other case as the eyepiece, and adjacent to each is a weak negative field lens VI, upon one surface of which may be engraved a reticle. Almost any known type of eyepiece can be used in systems embodying the invention but for wide-angle systems such as this example a preferred form of eyepiece is that described in the above-mentioned application No. 511,061 on "Eyepieces."

Lenses VII to IX in the two occurrences form the outer halves of the two erectors each with a focal length of 352 mm. These, if spaced closer together and with the Dove prism between them, would complete a short system.

Lenses X to XIII in the two occurrences form the inner halves of the two erectors, and lens XIV is the field lens between the two erectors. Lenses X to XIV to X form the unit which converts a short periscope to the present long one.

It should be mentioned at this point that the spacing between the halves of a relay lens is not particularly sensitive but must be kept below an arbitrary upper limit to prevent undue vignetting. This was true even in the prior art and is even more true in the present case in which each half of each relay lens is made up of a positive component and a negative component spaced somewhat apart after the fashion of a telephoto lens whereby the collimated beams of light have a smaller slope angle between the halves of the erector than they would have in the case of a half of an ordinary relay lens having the same front focal length on the short conjugate side. It is quite an ordinary procedure to set up the units of a periscope system on a lens bench and vary the spaces between them until a suitable tube length with tolerable vignetting is worked out.

Lenses VII to IX taken together have a negative Petzval sum. It is preferred that, as in this example, they be constructed as the two halves of an erector system according to the already mentioned application 511,060, now Patent 2,405,729, on Four component objectives.

In this example the system as a whole embodies the principles of copending application No. 511,062, Sighting devices.

Figures 4 and 5 show somewhat schematically a convertible periscope. The part shown in Fig. 5 is removable by means of the threaded ends 52 of the tube 51 and is shown in the removed position. The remainder of the system is shown in Fig. 4 with the two parts fastened together by means of the threaded joint 41 forming the short system.

I claim:

1. A periscope lens system comprising an objective, a positive field lens, two relay lenses, and an eyepiece, in which the two relay lenses are optically symmetrical with respect to the field lens whereby the lateral aberrations of this part of the system are corrected, each relay lens consisting of two halves separated by an airspace, and each half having a convergent effect, characterized by each relay lens in itself being unsymmetrical and having easily perceptible transverse aberrations, and by the system being convertible in that the inner halves of the two relay lenses are removable along with the field lens therebetween and the remaining two sections of the system are conjoinable to form a corrected periscope system of shorter length, and further characterized in that the outer halves of the two relay lenses each consists of an inner biconcave component and an outer biconvex component spaced apart by between $0.02f$ and $0.5f$ where $f$ is the focal length of the half, the radius of curvature of that surface of each biconcave component which faces the biconvex component being between 0.08 and 0.50 times that of the other surface of the biconcave component.

2. A plural-ended periscope comprising an eyepiece, a plurality of objective lens systems, and a rotatable plane reflecting element for optically and selectively aligning the objective systems with the eyepiece, two of the objective systems being of unequal length, of which the shorter system comprises an objective and one relay lens, the relay lens consisting of two symmetrical halves and the longer system comprises an objective, a positive field lens, and two relay lenses symmetrical to each other with respect to the field lens, characterized by each relay lens of the longer system consisting of two unsymmetrical halves and by the front half of the front relay lens and the rear half of the rear relay lens being duplicates of the halves of the relay lens of the shorter system.

3. A plural-ended periscope according to claim 2 further characterized by the halves of the relay lens of the shorter system each consisting of a positive component airspaced from a negative component concave toward the other half of the relay lens.

4. A periscope system according to claim 2 in which each half of the relay lens of the shorter objective system consists of an inner biconcave component and an outer biconvex component spaced apart by between $0.02f$ and $0.05f$ where $f$ is the focal length of the half, the radius of curvature of that surface of each biconcave component which faces the biconvex component being between 0.08 and 0.50 times that of the other surface of the biconcave component.

5. A periscope lens system which includes an objective, two relay lenses, a field lens, and an eyepiece, in which the two relay lenses are optically symmetrical with respect to the field lens therebetween, each relay lens consisting of two halves separated by air, the outer half of each relay lens being made substantially according to the following specification:

| Lens | N | V | Radii | Thicknesses |
|---|---|---|---|---|
| I | 1.62 | 55 | $R_1=+0.3\ F_1$ | $t_1=0.04\ F_1$ |
|   |      |    | $R_2=-0.5\ F_1$ | $S_1=0.09\ F_1$ |
| II | 1.70 | 56 | $R_3=-0.2\ F_1$ | $t_2=0.02\ F_1$ |
|    |      |    | $R_4=-0.1\ F_1$ |                 |
| III | 1.62 | 38 |                | $t_3=0.02\ F_1$ |
|     |      |    | $R_5=+1.1\ F_1$ | $S_2=F_1$       | and the inner half of each relay lens being made substantially according to the following specification:

| Lens | N | V | Radii | Thicknesses |
|---|---|---|---|---|
| IV | 1.70 | 56 | $R_6=+0.9\ F_2$ | $t_4=0.05\ F_2$ |
|    |      |    | $R_7=-0.3\ F_2$ |                 |
| V  | 1.75 | 47 | $R_8=-0.7\ F_2$ | $t_5=0.03\ F_2$ |
|    |      |    |                 | $S_3=0.3\ F_2$  |
|    |      |    | $R_9=-0.2\ F_2$ |                 |
| VI | 1.62 | 37 | $R_{10}=+0.2\ F_2$ | $t_6=0.03\ F_2$ |
| VII | 1.62 | 60 | $R_{11}=-0.4\ F_2$ | $t_7=0.05\ F_2$ | where the lens elements are designated by Roman numerals and the radii; thicknesses, and airspaces are designated by R, T, and S respectively with Arabic numeral subscripts, each category being numbered through the two tables in order from the outside toward the field lens, the radii R being given as + or − according to whether the surface is concave or convex toward the field lens, and the thickness of a prism divided by its refractive index being considered equivalent to the part of an airspace, where the refractive index N for the D line of the spectrum and the dispersive index V are given for each lens element, and where $F_1$ and $F_2$ are the respective focal lengths of the outer and inner halves, and in which $F_2$ is between $0.7\ F_1$ and $4\ F_1$.

WILLIAM DONALD ORSER.

REFERENCES CITED

The following references are of record in the file of this patent:

UNITED STATES PATENTS

| Number | Name | Date |
|---|---|---|
| 829,121 | Neumeyer et al. | Aug. 21, 1906 |
| 984,929 | Kellner | Feb. 21, 1911 |
| 1,091,933 | Humbrecht | Mar. 31, 1914 |
| 1,290,744 | Hollander | Jan. 7, 1919 |
| 1,445,284 | Bell et al. | Feb. 13, 1923 |
| 1,478,704 | Erfle | Dec. 25, 1923 |
| 1,468,762 | Taylor et al. | Sept. 25, 1923 |
| 2,085,050 | Stout | June 29, 1937 |

FOREIGN PATENTS

| Number | Country | Date |
|---|---|---|
| 409,465 | Great Britain | May 3, 1934 |
| 499,992 | Germany | June 25, 1930 |